E. L. GEBHARDT.
COMBINED FORK AND RAKE.
No. 177,498. Patented May 16, 1876.
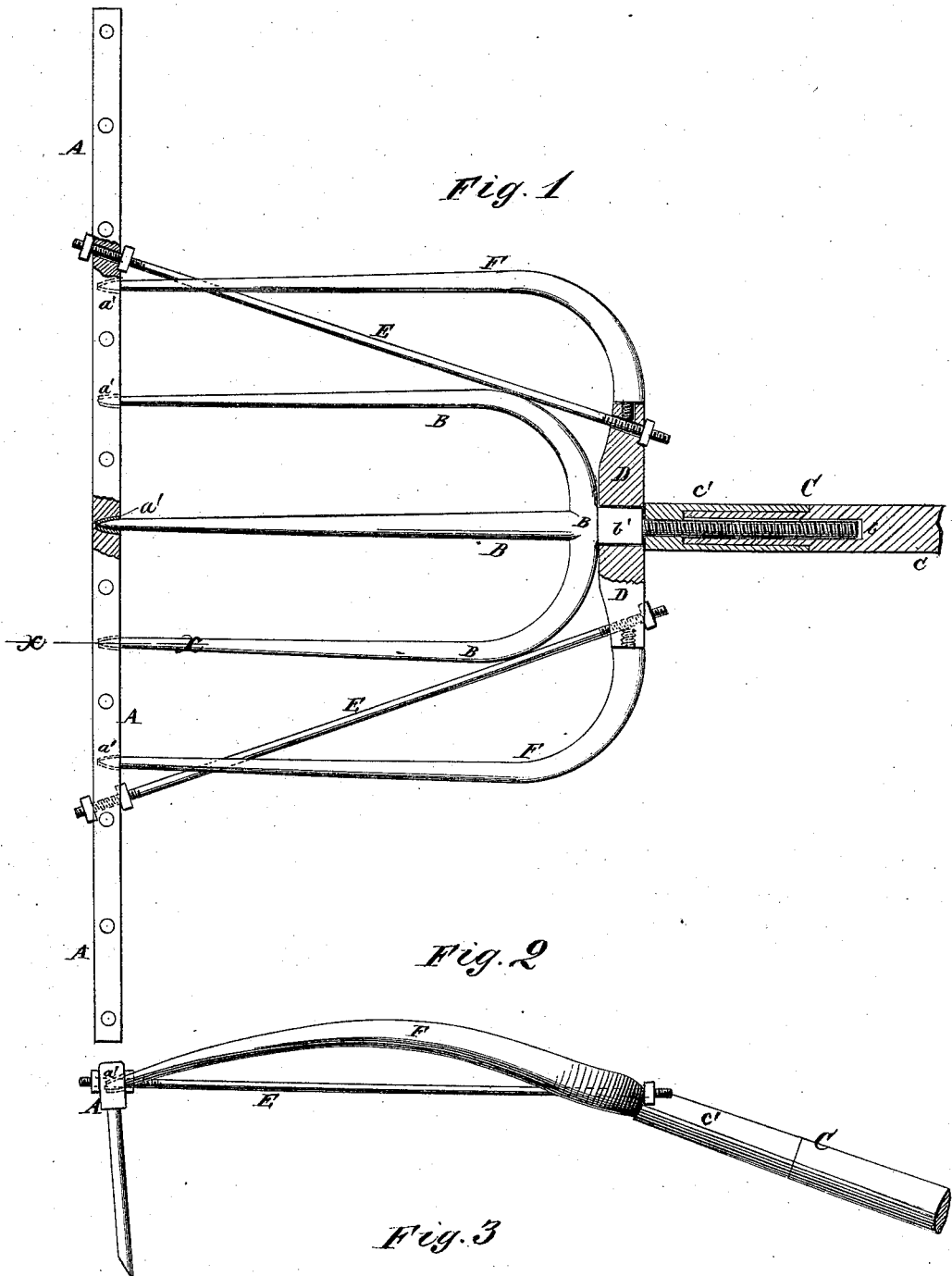
Fig. 1
Fig. 2
Fig. 3
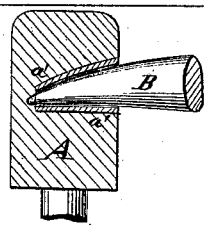
WITNESSES:
A. W. Almqvist
John Goethals
INVENTOR:
E. L. Gebhardt
BY
ATTORNEYS.

UNITED STATES PATENT OFFICE

ERNEST L. GEBHARDT, OF MILFORD, PENNSYLVANIA.

IMPROVEMENT IN COMBINED FORKS AND RAKES.

Specification forming part of Letters Patent No. 177,498, dated May 16, 1876; application filed March 25, 1876.

To all whom it may concern:

Be it known that I, ERNEST L. GEBHARDT, of Milford, in the county of Pike and State of Pennsylvania, have invented a new and useful Improvement in Combined Fork and Rake, of which the following is a specification:

Figure 1 is a back view of my improved instrument, parts being broken away to show the construction. Fig. 2 is a side view of the same. Fig. 3 is a detail section of the same, taken through the line $x\ x$, Fig. 1.

Similar letters of reference indicate corresponding parts.

The object of this invention is to furnish an improved farm implement, which shall be so constructed that it may be readily adjusted for use as a hay-fork, a manure-fork, and a rake, and which shall be strong and serviceable in either capacity.

The invention consists in the combination of the cross-head and the detachable side tines with the fork and the handle; and in the combination of the rake-head and the brace-rods with the fork, as hereinafter fully described.

B represents a three-tined fork, the base of the tang $b'$ of which is made square to fit into a square hole in the cross-head D. C is the handle, upon the lower end of which is secured a ferrule, $c'$. The lower part of the ferrule $c'$ is made solid, and with a screw-hole through it to receive the screw-thread cut upon the tang $b'$. In the ends of the cross-head D are formed screw-holes to receive the screws formed upon the ends of the side tines F, so that the fork may be changed from a three-pronged to a five-pronged fork by attaching the tines F. A is a rake-head, in the rear side of which are formed holes $a'$ to receive the points of the tines B F. The holes $a'$ are bushed with metal to prevent wear. E are two detachable brace-rods, which have screw-threads cut upon both ends. The forward ends of the rods E pass through inclined holes in the rake-head A, and have two nuts screwed upon them, one upon each side of the said rake-head. The other ends of the rods E pass through inclined holes in the cross-head D, and are secured in place by one or more nuts screwed upon them. The rake-head A and the brace-rods E are attached and detached according as the implement is to be used as a rake or as a fork.

Having thus described my invention, what I claim as new, and desire to secure by Letters Patent, is—

1. The combination of the cross-head D and the detachable side tines F with the fork B $b'$ and the handle C $c'$, substantially as herein shown and described.

2. The combination of the rake-head A and the brace-rods E with the fork B C F, substantially as herein shown and described.

ERNEST L. GEBHARDT.

Witnesses:
JAMES T. GRAHAM,
T. B. MOSHER.